US008374457B1

(12) United States Patent
Wang et al.

(10) Patent No.: US 8,374,457 B1
(45) Date of Patent: Feb. 12, 2013

(54) SYSTEM AND METHOD FOR INTERACTIVE IMAGE-NOISE SEPARATION

(75) Inventors: Jue Wang, Seattle, WA (US); Jia Chen, Kowloon (HK)

(73) Assignee: Adobe Systems Incorporated, San Jose, CA (US)

( * ) Notice: Subject to any disclaimer, the term of this patent is extended or adjusted under 35 U.S.C. 154(b) by 985 days.

(21) Appl. No.: 12/384,509

(22) Filed: Apr. 3, 2009

Related U.S. Application Data

(60) Provisional application No. 61/120,748, filed on Dec. 8, 2008.

(51) Int. Cl.
  *G06K 9/40* (2006.01)
(52) U.S. Cl. ......... 382/266; 382/260; 382/282; 382/302
(58) Field of Classification Search .......... 382/266, 382/260, 282, 302
  See application file for complete search history.

(56) References Cited

U.S. PATENT DOCUMENTS

| | | | | |
|---|---|---|---|---|
| 6,801,672 | B1* | 10/2004 | Thomas | 382/275 |
| 7,352,911 | B2* | 4/2008 | Maurer | 382/260 |
| 7,529,425 | B2* | 5/2009 | Kitamura et al. | 382/275 |
| 7,593,020 | B2* | 9/2009 | Zitnick, III | 345/592 |
| 7,643,699 | B2* | 1/2010 | Lim et al. | 382/275 |
| 7,702,173 | B2* | 4/2010 | Gao et al. | 382/260 |
| 7,783,125 | B2* | 8/2010 | Lim et al. | 382/265 |
| 2003/0026493 | A1* | 2/2003 | Kamath et al. | 382/260 |
| 2005/0041883 | A1* | 2/2005 | Maurer et al. | 382/260 |
| 2005/0244052 | A1 | 11/2005 | Keshet | |
| 2006/0226337 | A1 | 10/2006 | Lim | |
| 2007/0177817 | A1* | 8/2007 | Szeliski et al. | 382/275 |
| 2008/0152247 | A1 | 6/2008 | Oh et al. | |
| 2008/0204577 | A1 | 8/2008 | Tsuruoka | |
| 2008/0205785 | A1 | 8/2008 | Geiger et al. | |
| 2008/0239094 | A1 | 10/2008 | Baqai et al. | |
| 2008/0273793 | A1 | 11/2008 | Oishi | |
| 2009/0046943 | A1 | 2/2009 | Ishiga | |
| 2011/0097008 | A1* | 4/2011 | Cao et al. | 382/260 |

FOREIGN PATENT DOCUMENTS

WO  WO 2008106282 A1 * 9/2008

OTHER PUBLICATIONS

Noise ninja—guide.,PictureCode LLC, 2005, pp. 10 and 32-33.*
Edge—Manipulation, Farbman et al., ACM Trans. Graph, 2008, pp. 1-10.*
PictureCode LLC, Noise Ninja Plug-In User Guide, 2005, pp. 10 and 32-33.
Farbman, Z., et al., "Edge-preserving decompositions for multi-scale tone and detail manipulation," ACM Trans. Graph. 27, 3, 1-10, 2008.
Cohen, et al. 2007. Joint bilateral upsampling. ACM Trans. Graph. 26, 3, 96.

(Continued)

*Primary Examiner* — Jayesh A Patel

(57) ABSTRACT

An interactive system for separating image information from noise information in noisy input images may include a structure-preserving filter capable of separating high- and low-frequency image structures from random noise. The system may access data representing an initially denoised image and a corresponding initial noise layer, apply the structure-preserving filter to the noise layer to extract image structure, and combine the extracted structure with the initially denoised image to produce a refined image, restoring structure incorrectly removed from an image by a previous denoising operation. The system may provide brush tools to identify regions on which to apply the filter and mechanisms to specify filter parameter values. The filter may be applied iteratively to improve results, and may be employed in noise-consistent image editing tasks to preserve original image noise. The filter may be implemented by program instructions stored on a computer readable medium and executable by CPUs and/or GPUs.

41 Claims, 12 Drawing Sheets

OTHER PUBLICATIONS

Perona, P., and Malik, J. 1990. Scale-space and edge detection using anisotropic diffusion. IEEE Transactions on Pattern Analysis and Machine Intelligence 12, 7, 629-639.

Tomasi, C., and Manduchi, R. 1998. Bilateral filtering for gray and color images. In Proceedings of the International Conference on Computer Vision (ICCV), 839-846.

* cited by examiner

Initial Denoised Image | BLF | SPR
Filtering on In for Structural residual extraction

SYSTEM AND METHOD FOR INTERACTIVE IMAGE-NOISE SEPARATION

PRIORITY INFORMATION

This application claims benefit of priority of U.S. Provisional Application Ser. No. 61/120,748 entitled "Interactive High Quality Image Denoising" filed Dec. 8, 2008, the content of which is incorporated by reference herein in its entirety.

BACKGROUND

Description of the Related Art

Image noise is the digital equivalence of film grain for analogue cameras. For digital images, this noise appears as random speckles on an otherwise smooth surface which can significantly degrade image quality and thus adversely affect tasks that require accurate image information. Because resolution of modern digital cameras is increasing dramatically, so are the effects of image noise. For example, in low-light situations in which the ISO of a camera is set very high, the captured images may be very noisy. Image denoising (e.g., the problem of separating image noise from photographs) is a traditional research problem that has been extensively studied for decades, and various commercially available software packages include features directed to reducing or removing noise in images.

Some image denoising algorithms take advantage of the fact that natural images exhibit sparsity in the wavelet domain. In such algorithms, by decomposing a noisy image into sub-bands, the coefficients of the clean image can be estimated by per-pixel suppression of low-amplitude values, or inferred using a joint prior involving image neighborhood. Other methods, such as anisotropic diffusion, work in the image domain, and iteratively perform edge preserving filtering. Bilateral filtering has been proposed as a non-iterative alternative to anisotropic diffusion, which has been widely adopted in edge preserving image editing tasks. Both techniques can be used for noise reduction. Recently Markov random fields and conditional random fields have also been applied in denoising in computer vision. These approaches use different statistical image priors in a graph setting to infer the clean image.

Previous denoising methods mainly focused on removing noise automatically from the image without any user interaction. Although visually good denoising results have been achieved by these methods, they are incapable of achieving very high quality results. Using these current denoising methods, image structures are often smoothed out and noise may not be adequately removed from certain image regions. Most existing image denoising algorithms focus on fully automatic noise level estimation and noise removal. In the absence of user control, the output may contain artifacts unacceptable for applications requiring accurate image information.

On the other hand, although noise is often treated as an undesirable artifact, it can be desirable in certain applications. For example, many image operations and photo-editing tasks require image noise be preserved in the results to make them look natural (e.g., it can add an old-fashioned, grainy look to an image that is reminiscent of early film). In fact, preferring existing noise to be preserved in photographs has become so common that "adding noise" is a standard feature in many professional image editing tools such as Photoshop® from Adobe Systems Incorporated.

SUMMARY

Systems and methods for separating image information from noise information in noisy input images are disclosed. The interactive system described herein may include a structure-preserving filter, which is capable of separating both high- and low-frequency image structures from random noise. When working in tandem with existing denoising algorithms, this interactive system may significantly improve performance and produce higher quality image-noise separation results than are possible using existing denoising techniques alone. The system may in some embodiments be employed in various noise-consistent image editing tasks such as sharpening, blurring, and retargetting, where preserving the original image noise is a desired feature. The system may include various controls to allow a user to interactively improve the image-noise separation quality. In some embodiments, a set of brush tools is provided for the user that may be used to identify different image regions on which to apply the filter. The filter may be applied in an iterative manner until satisfactory results are achieved.

The methods described herein may take as input an initial image-noise separation result, in some embodiments. The result may include an initially denoised version of the image and a corresponding initial noise layer. In such embodiments, the amount of user input needed to achieve a satisfactory high quality result may be proportional to the quality of the initial separation. In other embodiments, the methods may include the application of an exiting denoising technique to produce an initially denoised latent image. In some embodiments, the initial noise layer may be obtained by subtracting the initially denoised image from the noisy input image.

The methods described herein may include accessing data representing an initially denoised image and data representing the corresponding initial noise layer, applying the structure-preserving filter to the data representing the initial noise layer to extract image structure from the initial noise layer, and then combining the data representing the extracted image structure with the data representing the initially denoised image to produce a refined image, thus restoring image structure that may have been incorrectly removed from a noisy input image during the initial denoising operation. The refined image may be displayed, or data representing the refined image may be stored for later use, in different embodiments.

The data representing the extracted image structure may be subtracted from the data representing the initial noise layer to produce a refined noise layer, i.e., one that includes pure random noise, and that includes less image structure than the initial noise layer. This refined noise layer may in some embodiments be presented to a user for one or more additional applications of the structure-preserving filter, e.g., iteratively applying the filter until satisfactory results are achieved. The results of this iterative process may then be combined with the initially denoised image or the refined image described above, to restore additional image structure to the final output image. In some embodiments, the refined noise layer may be stored for later use.

The system may include a user interface through which a user may provide input identifying a region of the initial noise layer on which to apply the structure-preserving filter. For example, the user interface may include a brush tool usable to identify portions of the initial noise layer containing image structure that should be extracted using the structure-preserving filter. The value of one or more configurable parameters of the filter may be specified by the user through various input mechanisms of the user interface, in some embodiments. For example, the user interface may include a radio button, a slider bar, an alphanumeric text entry box, a pop-up menu, a pull-down menu, or a dial, in various embodiments. The configurable parameters may include a distance variance parameter, a color variance parameter, a structural variance parameter, or a brush strength parameter, in various embodiments. In some embodiments, one or more of the configurable filter parameters may have a default value, and this default value may be overridden through the user interface.

In some embodiments, the user interface may be configured to receive input identifying a region of the initially denoised image on which to apply a denoising technique to produce a smoother denoised image. For example, the user interface may include a brush tool usable to identify portions of the initially denoised image containing noise that should be removed through the application of the denoising technique. The denoising technique applied to the identified area may be the same technique that performed the initial image-noise separation (e.g., an existing denoising technique) or may be a different denoising technique than the technique that produced the initial results. In some embodiments, the brush tool may be iteratively applied to the initially denoised image, or the refined image, to further smooth the image until a final output image of acceptable quality is achieved. This final output image may be displayed to the user and/or stored for later use, in various embodiments.

The methods described herein may in some embodiments be provided as a module of a graphics application, such as an image editing module supporting image-noise separation. The image editing module may be implemented by program instructions stored on a computer readable medium and executable by one or more processors (e.g., one or more CPUs and/or GPUs) to cause the processor(s) to perform the functionality described herein.

Figure 1A:
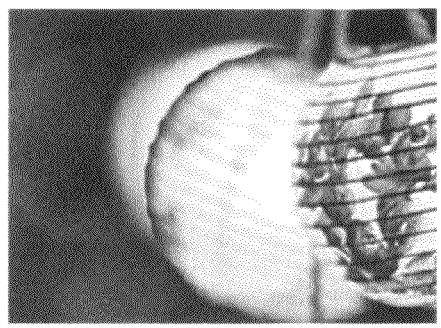
FIGS. 1A-1E illustrate the application of an image denoising technique, according to one embodiment.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follows are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As noted above, many commercially available image editing applications include features that attempt to reduce or remove noise from images. Given an input noisy image I, a goal of a denoising technique is to decompose the input image into a noise-free latent output image $I_l$ and a noise image $I_n$. Previous denoising approaches focused on the output image, and not on how good the noise image was. In addition, without fine user controls, the final output of these previous denoising approaches may contain undesired artifacts for applications where noise needs to be accurately separated from the image. As noted above, using previous approaches, image structures are often smoothed out and noise may not be adequately removed from certain image regions. In some embodiments, the techniques described herein may be used to divide an input image into image domain and noise domain and to operate on both of these outputs to obtain a better result. In some embodiments, this approach may result in both a sharper final image than previous approaches, and a residual image that includes only purely random noise.

One reason that previous denoising algorithms encounter difficulties in balancing the tradeoff between removing noise and preserving image structures is that image edges have high frequency gradients which can be easily misclassified as noise. Another reason is that previous methods were mainly applying analysis in the original image without paying attention to the spatial statistics of the noise image. In some embodiments, the system and methods described herein take these spatial characteristics into account and produce better denoising results than previous methods.

As noted above, currently available software solutions for denoising are typically highly automated, and do not support significant inputs through user interaction. Instead, they implement a particular algorithm to identify noise and apply it to an input image to produce a result. In many cases, the noise in the input image is not completely removed from smooth regions using these techniques. Removing image noise and preserving the image structure are two sides of the denoising problem that have very different goals. These goals may be very difficult to achieve simultaneously. The system and methods described herein may provide the user with some degree of control over the denoising operation, through interactive tools. In some embodiments, a user may apply these controls such that based on initial results (e.g. using an existing denoising technique), the user may be able to refine the results to obtain a higher quality output image.

The system and method described herein may, in various embodiments, be built upon a structure-preserving filter. As described herein, this filter may be applied to initial denoising results to produce both a cleaner latent image and a more purely random noise layer. In some embodiments, the system may operate on both the image layer and the noise layer, and may be configured to simultaneously take advantage of the sparseness of image structures and the spatial randomness of pure noise. In some embodiments, the interactive system may take an initial decomposition result produced by an automatic image denoising algorithm as input, and may provide an efficient brush-based interface that allows the user to refine user-specified local regions of both the latent image $I_l$ and the noise layer $I_n$, thus achieving high quality image-noise separation in an interactive way. For example, the interface may allow the user to roughly mark the high frequency structures that have been mistakenly removed, or the smooth regions where noise still presents. The system may then apply the techniques described herein to improve the image-noise separation result and may give the user real-time feedback.

In some embodiments, the system and methods described herein may include the following contributions over previous denoising methods:

1. A structure-preserving filter based on the two-layer representation that is able to distinguish random noise from both high-frequency and low-frequency image structures.
2. A user interface and corresponding set of controls that allow the user to interactively and efficiently work on both the image layer and the noise layer to improve the image-noise separation results and reduce or eliminate visual artifacts. For example, in some embodiments, the user may specify various filter parameters, including where to apply the filter (using a brush), and the strength of the brush (i.e., how strongly to apply the filter).

As previously noted, existing denoising solutions typically exhibit two problems: image structures are often smoothed out and noise may not be adequately removed from certain image regions. FIGS. 1A-1E illustrate an example of the application of a denoising technique in a commercially available application.

Figure 1B:
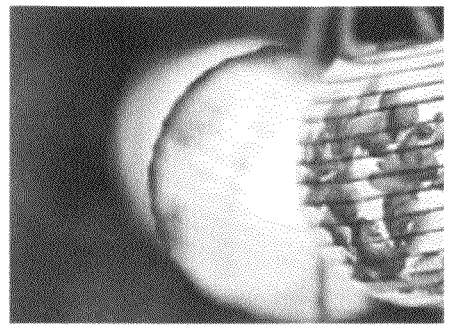

In this example, the previous denoising algorithm is applied to an input image I (FIG. 1A) to generate a denoised (latent) image $I_l$ (FIG. 1B). A noise image $I_n$ may then be computed as the difference between the input image and the denoised image resulting from the application of the denoising algorithm:

$$I_n = I - I_l \qquad (1a)$$

Figure 1C:
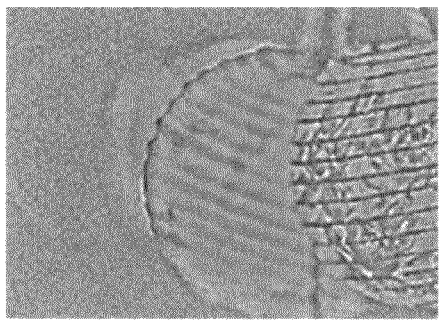

The resulting noise image is shown in FIG. 1C. One problem illustrated by this example is that while the denoising technique removed some of the noise, it also removed some of the detail in the image as noise, i.e., high frequency image structures. In this example, the noise image exhibits clear structure silhouettes, indicating that the image structures have been smoothed out. The ideal noise image, however, should be a completely random signal. In addition, as shown by the close-up view of FIG. 1A shown in FIG. 1D and the close-up view of FIG. 1B shown in FIG. 1E, noise was not fully removed in some of the smooth regions of the input image, using the previous denoising approach.

Figure 2:
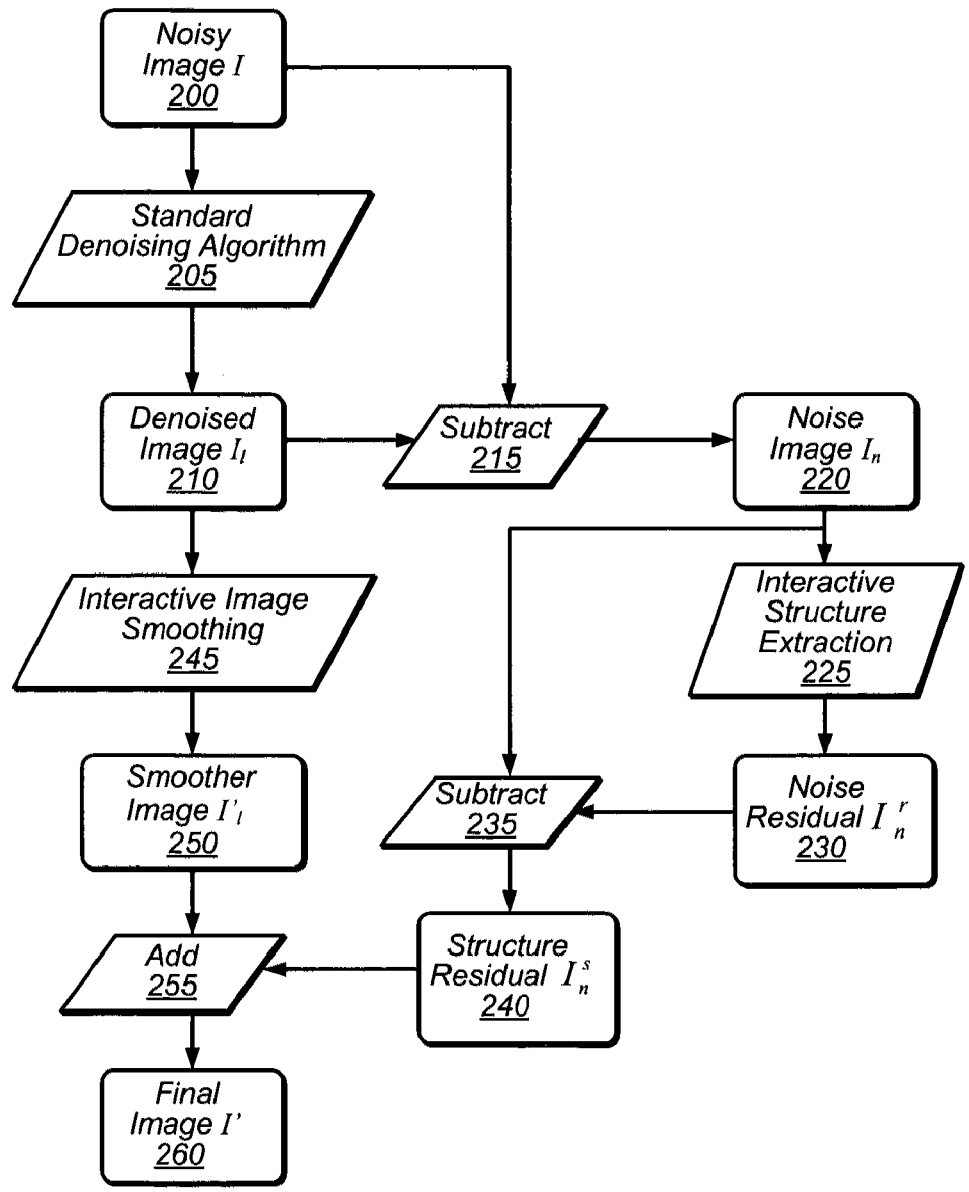
FIG. 2 illustrates a method for performing image-noise separation, according to one embodiment.

A method for high quality image-noise separation is illustrated in FIG. 2, according to some embodiments. In this example, the method may begin by applying an existing denoising approach (205) to a noisy input image I (200) to produce an initial denoised image $I_l$ (210). The method may include subtracting the denoised image 210 from the input image 200 to produce an initial noise image $I_n$ (220), as shown in 215.

In this example, the method may operate on these two image layers (i.e., the two outputs 210 and 220). As illustrated in FIG. 2, an interactive process may be applied to noise image 220 to extract structural information from noise image 200, as in 225. In some embodiments, this process may include the application of a structure-preserving filtering technique, as described in more detail below. In general, given an image patch (e.g., a portion of the initial noise image 220 comprising a mixture of structural information and noise), the structure-preserving filtering technique may be used to separate the structural information from the noise. This results in a noise residual image $I_n^r$, shown at 230. The method may include subtracting the noise residual image 230 from the initial noise image 220, as in 235, to produce a structure residual image $I_n^s$, shown at 240. In some embodiments, interactive structure extraction 225 and subtraction

235 may be applied iteratively (e.g., additional structure information may be extracted from noise residual image 230 one or more times) until a satisfactory result is obtained. However, for simplicity, this is not shown in FIG. 2.

As shown in the example illustrated in FIG. 2, the method may also include performing interactive image smoothing on user identified portions of the initial denoised image $I_l$ 210, as in 245, to produce a smoother version of the denoised image, shown as $I_l'$ (250). This operation may serve to identify and extract additional noise in the initially denoised image 210 and remove it from the final image. In some embodiments, interactive image smoothing may be applied iteratively (e.g., additional smoothing may be applied to smoother image 250 one or more times) until a satisfactory result is obtained. However, for simplicity, this is not shown in FIG. 2. In various embodiments, the method may include any number of interactive structure extraction operations on noise image 220 or noise residual image 230, and any number of interactive smoothing operations on denoised image 210 or smoother image 250, in an alternating manner, serially, or in any arbitrary order.

In this example, the method may include adding the structure residual image $I_n^s$ (240) back into the smoother image $I_l$ (250), as shown at 255. As shown in the example illustrated in FIG. 2, the methods described herein may be used to improve both the initial denoised image 210 and the initial noise image 220. The final image I' produced by this method (shown as 260) may be a noise-free, sharp image whose high frequency details have be faithfully preserved, and the resulting noise image 230 may look more like purely random noise.

A system and method for image-noise separation is described in more detail below, according to various embodiments. Given an input noisy image I, the goal of a denoising operation may be to accurately decompose it into a noise-free latent image $I_l$ and a noise image $I_n$ as:

$$I = I_l + I_n \quad (1b)$$

For the purpose of simple denoising, $I_n$ may be simply discarded and $I_l$ is the natural output. In other applications where the noise needs to be preserved, various image editing operations may be applied on $I_l$ to produce a new latent image $I_l'$, and $I_n$ can be applied back to generate the final image as:

$$I' = I_l' + f_n(I_l', I_l, I_n) \quad (2)$$

where $f_n$ is a noise synthesis function.

Figure 1D:
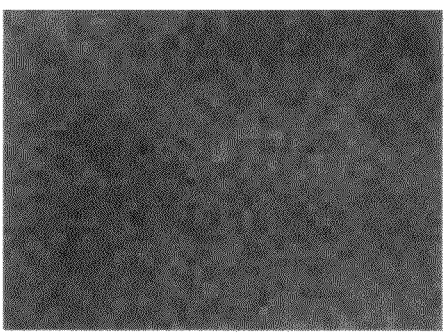
Figure 1E:
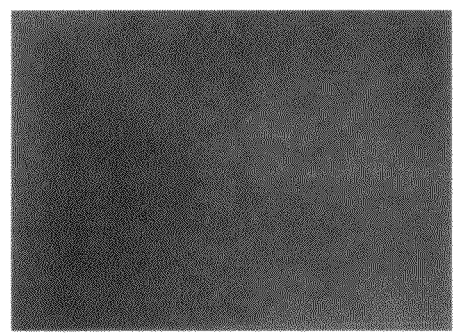

As previously noted, one way to achieve this decomposition is to apply existing noise reduction/removal algorithms, which aim at estimating a visually appealing latent image $I_l$. This problem has been extensively studied for many decades in the signal and image processing community, resulting in a large volume of research literature as well as various commercial software packages. However, previous approaches have been largely focused on automated methods for noise estimation and removal. This approach may be extremely challenging, since noise modeling in a specific image may be greatly affected by capturing instruments, data transmission media, image quantization, and discrete sources of radiation. Any single algorithm may not be able to work perfectly in all cases. As previously noted, typical artifacts present in an image-noise decomposition result using existing fully-automated approaches may include:

Over-smoothed image structures. In many denoising algorithms, high-frequency image structures are often mistakenly estimated as noise and removed from I, resulting in an over-smoothed $I_l$, as shown in FIG. 1D.

Residual noise in smooth regions. If the noise level is not estimated accurately in I, noise residual may still be present in the smooth regions of $I_l$, which is often quite noticeable, as in the example illustrated in FIG. 1E.

In order to reduce these artifacts, automatic denoising systems may provide the user limited control to adjust a set of parameters for the algorithms, either globally or locally. However, these parameters may not be intuitive and may be difficult to tweak. Even with the adjustable parameters, it is still difficult for automatic approaches to completely eliminate all artifacts. Furthermore, the quality of the noise image $I_n$ is typically not considered in these approaches. For example, the "threshold parameter" in Photoshop's unsharp mask can suppress certain amount of noise when sharpening the image. However, it cannot distinguish noise and high frequency image structure very well. As previously noted, adding noise/grain is a common feature in imaging software, but the synthesized noise added to the image is typically derived from a presumed parametric statistical model, which may or may not match the desired noise characteristics. Without a high quality $I_l$ and $I_n$, the goal of noise-consistent image editing may be difficult to achieve, as shown in the examples in FIGS. 1A-1E. The system and methods described herein which employ a structure-preserving filter, may in some embodiments provide more user control and higher quality results than are possible with such automated approaches.

Structure extraction from a noise image (such as operation 225 illustrated in FIG. 2) may be described in more detail by way of example. The noise image $I_n$ shown in FIG. 1C presents strong thin lines corresponding to the high-frequency structural edges. Although the structures are visually noticeable, separating them from $I_n$ may not be an easy task since they are both high frequency signals. However, one of the biggest differences between them may be that noise is spatially random while the image structure is not. In some embodiments, the structure-preserving filter described herein may be capable of doing that. In other words, the filter may consider the spatial characteristics of the pure noise and the image structure in $I_n$.

As described above with reference to FIG. 2, in one embodiment, the filter may further separate the initial noise image into noise residual and structure residual:

$$I_n = I_n^r + I_n^s \quad (3)$$

In some embodiments, two tasks that may be considered when designing the structure-preserving filter: determining the direction of integration and define proper weights for those samples involved in the integration.

Figure 3:
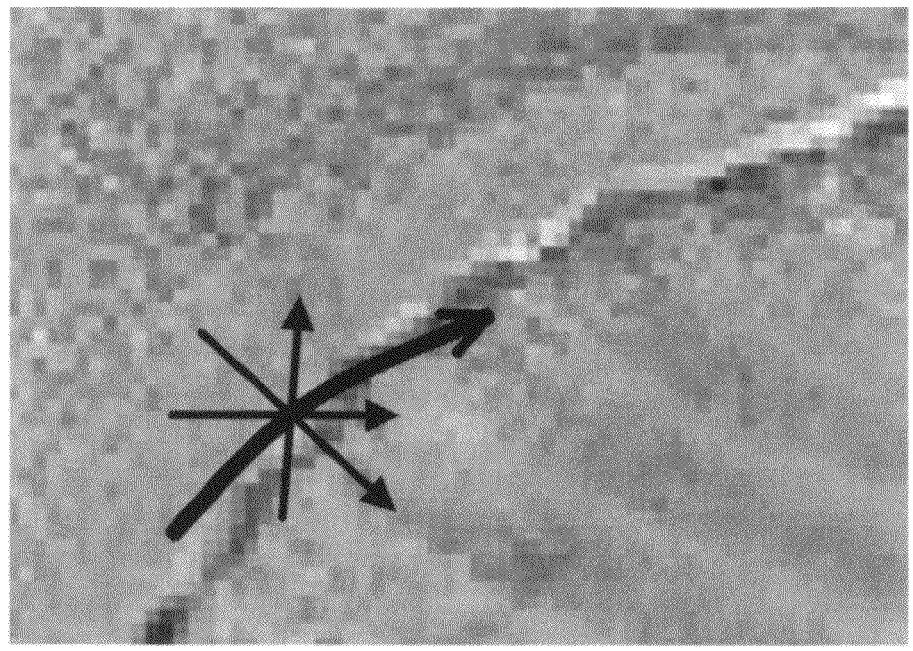
FIG. 3 illustrates identification of local neighborhoods for structure extraction, according to various embodiments.

Typically, a structural element will have similar pixel colors along certain paths/lines. In some embodiments, the image-noise separation process may take advantage of this to separate the structure from the real noise in the noise image. This may be illustrated using the example shown in FIG. 3. FIG. 3 depicts as portion of a noise image that includes an image structure that was removed as noise. In this example, each of the arrows represents a path along which pixel values may be integrated in the local neighborhood. When integrating the pixel color along a path corresponding to the structural element, the average of the pixels in the neighborhood of each of the pixels in the direction(s) along this path may represent the average color of the pixels of the structural element. In this example, the average of neighborhood pixels in any other directions will be zero (i.e., because they represent real noise, and thus are purely random).

In some embodiments, the structure-preserving filter may be configured to find the path along which the average color is not zero, but is the average of the color of the pixels of the structural element. In the example shown in FIG. 3, the neighborhood direction shown as the curved line is a better choice than those shown by the straight lines. In other words, the curved line represents the correct integration path because it is the one that represents a structural element. In this way, the filter may be used to identify the structural element in the image (as opposed to noise) and to separate it from the actual noise. In some embodiments, the filter is applied in a region of the noise image selected by the user using a brush tool, as described in more detail later.

As previously noted, one of the biggest differences between high frequency image structures and pure random noise lies in their autocorrelation functions, and a structure-preserving filter may in some embodiments be configured to separate them by recognizing these differences. For example, if p denotes a pixel location, then $I_n(p)$ may be further decomposed into two components: the structural residual $I_n^s(p)$ and the pure noise signal $I_n^r(p)$ as:

$$I_n(p)=I_n^s(p)+I_n^r(p) \quad (4)$$

For random noise, it may be reasonable to assume $E(I_n^r(p))=0$ and $Var(I_n^r(p))=L_l(p)\sigma_n^2$. Thus:

$$\lim_{|\Omega(p)|\to\infty} \sum I_n^s(p) = E(I_n(p)) \quad (5)$$

where $\Omega(p)$ is the neighborhood area of p and $|\Omega(p)|$ is its size.

For the structure residual $I_n^s(p)$, its exact statistic distribution may be unknown. However, given the smoothness prior of natural images, one may assume that there is a high probability that a nearby pixel q has the same residual asp if the following criteria are met:

1. p and q have similar recovered colors in the denoised image $I_l$
2. p and q are spatially close to each other
3. p and q are located on the same image structure Criterion 1 and 2 basically assume that image properties vary smoothly in flat regions, while criterion 3 allows the properties to have sudden changes when crossing structural edges. Based on these criteria:

$$P(I_n^s(p)=I_n^s(q))=c\cdot W_c(p,q)\cdot W_d(p,q)\cdot W_s(p,q) \quad (6)$$

where c is a normalization constant. In this example, $W_c(p, q)$ represents a measurement of the color distance between p and q on the latent image $I_l$ as:

$$W_c(p,q)=\exp(-\|I_l(p)-I_l(q)\|^2/\sigma_c^2) \quad (7)$$

where $\sigma_c$ represents the color variance. In this example, $W_d(p, q)$ represents the spatial distance term, which is defined as:

$$W_d(p,q)=\exp(-\|p-q\|^2/\sigma_d^2) \quad (8)$$

with $\sigma_d$ representing the distance or spatial variance. In some embodiments, these two terms may be defined in a manner similar to that used in traditional bilateral filtering.

In this example, $W_s(p, q)$ represents a unique structure term used in some embodiments of the structure-preserving filter described herein. This structure term measures whether p and q are located on the same image structures, i.e., different semantic edges in the image. In some embodiments, this term may be introduced into the filter so that even if p and q are similar both in color and spatial space, if they are located on different image structures, then they are independent of each other and thus $P(I_n^s(p)=I_n^s(q))=0$. This may be mathematically defined as:

$$W_s(p,q)=\exp\{-(p-q)^T D_p^{-1}(p-q)/\sigma_s^2\} \quad (9)$$

where $\sigma_s$ represents the structural variance parameter, and $D_p$ represents the local structure matrix centered at p and computed from the latent image $I_l$. In such embodiments, if $\nabla I_l(p)=[I_l^x(p), I_l^y(p)]^T$ denotes the gradient vector at p, then the averaged local structure tensors in a neighborhood A and its SVD may be given by:

$$D_p' = \frac{1}{|A|}\sum_{p\in A} \nabla I_l(p)\nabla I_l(p)^T = US U^T \quad (10)$$

Replacing $$\begin{pmatrix} s_1 & 0 \\ 0 & s_2 \end{pmatrix}$$

with $$\begin{pmatrix} \frac{s_1}{s_2} & 0 \\ 0 & \frac{s_2}{s_1} \end{pmatrix},$$

the local structure matrix is defined as:

$$D_p = US'U^T \quad (11)$$

In this example, once all the terms are defined in equation 6, the following filtering process may be applied to estimate $I_n^s(p)$ as:

$$I_n^s(p) = \frac{\sum_{q\in A} W_c(p,q)W_d(p,q)W_s(p,q)\cdot I_n^s(q)}{\sum_{q\in A} W_c(p,q)W_d(p,q)W_s(p,q)}$$

$$\approx \frac{\sum_{q\in A} W_c(p,q)W_d(p,q)W_s(p,q)\cdot I_n(q)}{\sum_{q\in A} W_c(p,q)W_d(p,q)W_s(p,q)} \quad (12)$$

where the sum over the noise term $I_n^r(p)$ is eliminated given equation 5.

In some embodiments, the system may provide interactive tools such that the user can control the filtering process from different aspects. For example, tools may be provided to allow the user to specify regions of an image on which to apply the filtering described herein and/or to specify various filtering parameters.

Figure 4:
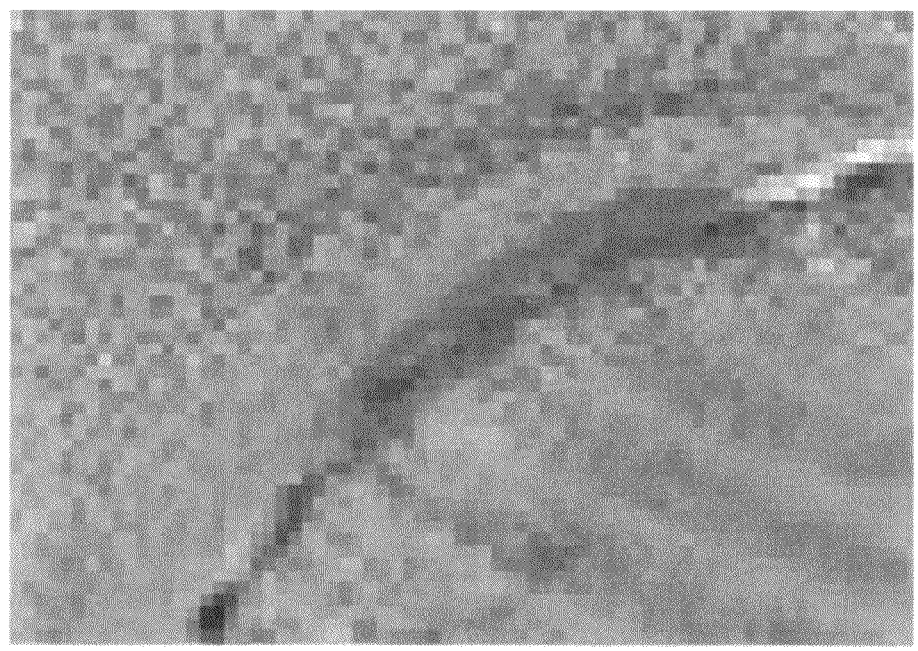
FIG. 4 illustrates the application of a brush tool to a structure in a noise image, according to one embodiment.

In some embodiments, the user may choose the region(s) to process using a brush tool of a graphical user interface (e.g., using mouse brushes). In some embodiments, the diameter of the brush size may also be adjusted by the user to fit the size of image structures. The system may then automatically process pixels within the selected region in real-time, and give the user instant feedback. FIG. 4 illustrates an example of the use of a user-specified brush for selecting a region of interest. In this example, the filter may be applied only in the region identified by the brush stroke.

In some embodiments, the system may include tools to allow the user to specify the strength of the filtering operation that is to be applied in the region identified by the brush stroke (i.e., the brush strength). In some embodiments, using a smaller strength may allow the brush to be applied onto the image repeatedly for incremental improvements. In some embodiments, this may be implemented using a weighted averaging method. In such embodiments, after each iteration of the structure extraction process, a portion of the structure residual may be added back to the denoised image, according to the brush strength, a:

$$I_l \leftarrow \alpha \cdot I_n^s + (1-\alpha) \cdot I_l' \qquad (13)$$

In this example, the denoised image $I_l$ in equation 13 may again be used as reference image in the structure aware filter in a subsequent iteration.

As previously noted, some commercial denoising software packages provide a number of parameters that the user can adjust in order to get a better result. For instance, the user may be able to globally adjust the noise level automatically estimated, the strength of the denoising operation, and other algorithm-specific parameters. Some denoising applications also provide local editing brushes, but the functionality of the brush is limited only to invoking an "undo" or "redo" of a denoising operation in the local region. By contrast, the user controls of the system described herein may be more effective in assisting the user to generate high quality results. Unlike with existing tools, these user controls may be general and may not be limited to a specific initial denoising algorithm.

Figure 5:
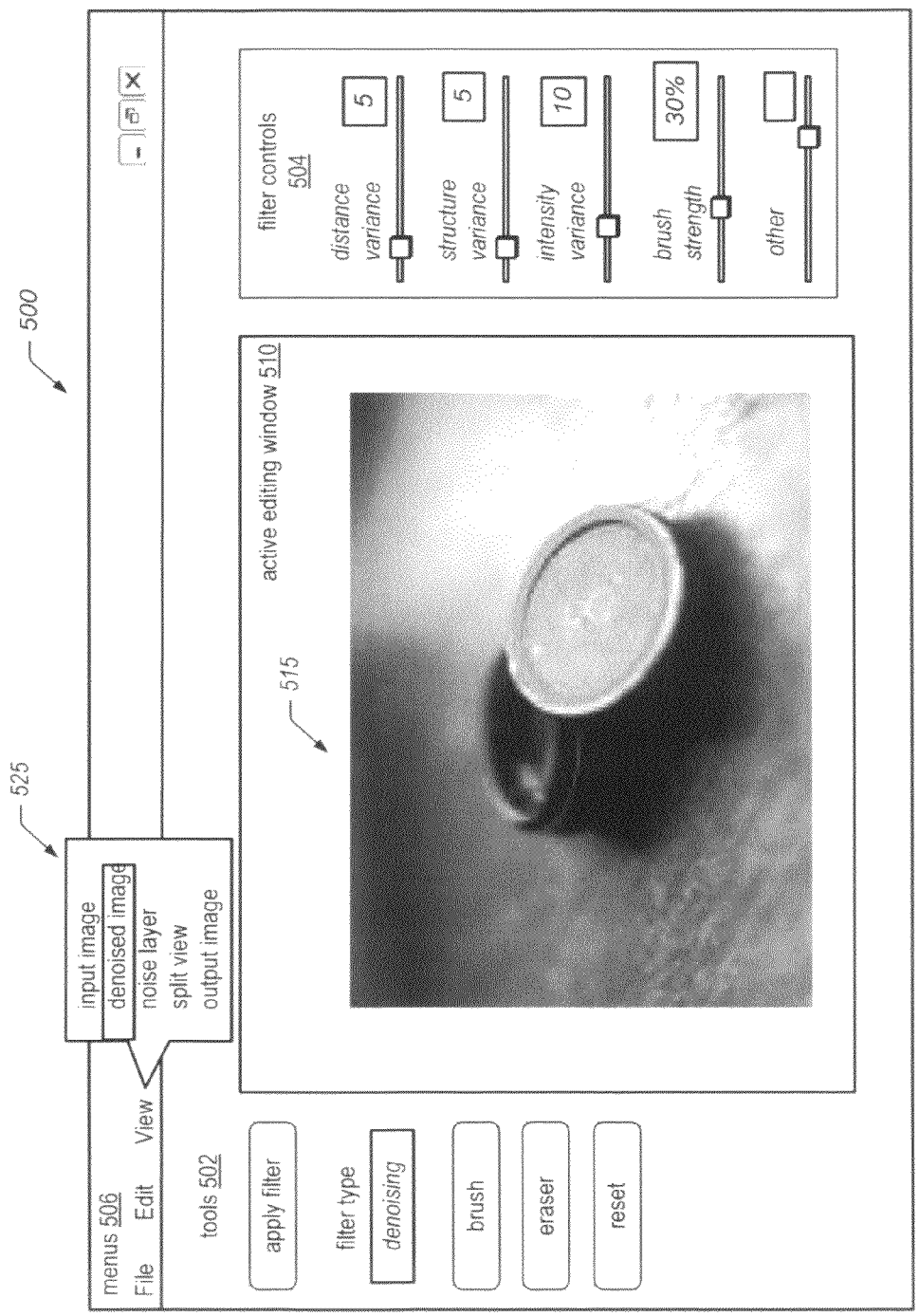
FIG. 5 illustrates a graphical user interface in an image editing application, according to one embodiment.

In some embodiments, various filter parameters, such as $\sigma_s$ and $\sigma_c$, may be controlled by the user. In different embodiments, the system may provide various input mechanisms with which the user may input values for these parameters. For example, in some embodiments, an image editing application providing the denoising functionality described herein may include a graphical user interface (GUI), which may present slider bars, pop-up menus, pull-down menus, dials, text entry boxes, or other mechanisms for specifying values or relative values of these and other configurable parameters. For example, FIG. 5 illustrates a GUI of an image editing application (or image editing module of another type of application) that may provide mechanisms for a user to apply the denoising techniques described herein and to adjust one or more parameters of a structure-preserving filter, according to one embodiment. In this example, an image editing module may provide a brush tool and one or more user interface elements whereby a user may select and control the application of the denoising techniques described herein. The user interface may also provide user interface elements for controlling various aspects of other image editing operations and/or for performing other image-related tasks. The user interface illustrated in FIG. 5 is provided as an example of one possible implementation, and is not intended to be limiting.

FIG. 5 illustrates an example display 500 depicting various frames that may be visible to a user during an image editing operation. In this example, the display is divided into four regions or areas: menus 506, tools 502, filter controls 504, and active editing window 510. Tools 502 may include one or more user-selectable user interface elements. In this example, it is this area that contains the user interface elements that a user may select to apply various effects to an image. In the example illustrated in FIG. 5, the user may select a filter tool, and may specify the type of filter to be applied to an image 515 being edited in active editing window 510. In this example, the user has selected the application of a denoising filter. Selection of this tool may in various embodiment result in an initial denoising operation being applied to the image and/or in allowing the user to refine an initially denoised image, as described herein. In the example illustrated in FIG. 5, the user may select a brush tool for use in applying the denoising operation or denoising refinement operation to the image. Other optional tools may be selected as well, such as an eraser or reset function. While FIG. 5 illustrates the elements in tools 502 as buttons, other types of user interface elements, such as pop-up menus, may be used to select from among one or more tools in various embodiments. In various embodiments, the reset and eraser tools illustrated in FIG. 5 may or may not be included in the user interface. Various embodiments may include other tools not shown as well, such as an "undo" tool that undoes the most recent user action in active editing window 510.

In the example illustrated in FIG. 5, filter controls 504 may include one or more user-modifiable controls, such as slider bars, dials, pop-up menus, alphanumeric text entry boxes, etc., for specifying various parameters of a denoising filter that is to be applied to an image (e.g., using the brush tool). In this example, slider bars are provided for specifying the distance variance parameter, the structure variance parameter, the intensity variance parameter, and the brush strength of the operation. An additional slider bar is illustrated for specifying an additional parameter of the denoising filter ("other").

In the example illustrated in FIG. 5, menus 506 may include one or more menus, for example menus used to navigate to other displays in the image editing application, open files, print or save files, undo/redo actions, view one or more selected representations of images, and so on. In some embodiments, an image representation (e.g., a file containing image data, metadata, etc.) may be identified by the user through the "file" option in menu area 506. This menu item may include, for example, a user-selectable pull-down option for importing images or frames from an identified file. In the example illustrated in FIG. 5, active editing window 510 is the area in which an image being edited is displayed as various editing and/or filtering operations are performed. In various embodiments and at various times, active editing window 510 may display a portion or all of an original (noisy) input image to which a denoising operation is to be applied, a portion or all of an initially denoised image, an initial noise layer, a refined latent image or noise layer, an output image, or any intermediate latent image or noise layer representations produced as part of the denoising operation, as described herein.

In the example illustrated in FIG. 5, menu 506 includes a "view" option. This menu item may include, for example, a user-selectable pull-down or pop-up menu (525) usable to select which of various representations of an image are displayed in active editing window 510, or in another area of display 500. In other embodiments, different input mechanisms may be provided for selecting a view to be displayed, such as one or more radio buttons, alphanumeric text boxes, dials, etc. In this example, one of the available viewing options is a "split view", in which two or more representations of an image may be simultaneously displayed (e.g., an intermediate denoised image and corresponding noise layer may be displayed while the user iteratively applies a brush tool to one or both representations). In some embodiments, as the user iteratively applies the techniques described herein for extracting structure from a noise layer and/or refining a latent image, the system may be configured to automatically update and/or store the data representing these modified image views. The system may also be configured to automatically refresh the images being displayed in response to these updates.

In the example illustrated in FIG. 5, an image editing application may receive user input representing the selection of a denoising operation using tools 502. In this example, the user may provide input specifying a region of an image (e.g., a latent image or noise layer) on which refinement of the denoising operation may be applied using the brush tool of the GUI. The user may employ the brush tool to represent the stroke of a brush as the user moves a cursor (e.g., using a mouse, touch pad, keyboard, track ball, etc.) across the image.

In this example, the user may specify one or more of the parameters for which controls are included in filter controls 504.

In some embodiments, a user may be prompted to provide one or more of the inputs described above in response to invoking a filtering operation of the image editing application. In other embodiments, the image editing application may provide default values for any or all of these inputs. In still other embodiments, the image editing application may be configured to automatically determine the values of various parameters of a filtering operation, dependent on other known parameter values (i.e. metadata) associated with the image. In one such embodiment, the image editing application may be configured to automatically determine a set of default values for one or more parameters of the filtering operation dependent on characteristics of similar images. For example, it may determine a set of default filter parameter values for a denoising operation on an outdoor scene dependent on filter parameters used in a previous denoising operation applied to an outdoor scene. In some embodiments, the user may be allowed to override one or more default filter parameter values using an interface similar to that illustrated in FIG. 5.

Using the slider mechanisms illustrated in FIG. 5, the user may select values for various parameters of the structure-preserving filter described herein. The value of the first parameter, distance variance, may represent the size of the neighborhood to be considered by the filter (e.g., in the weighting described above). As described herein, the value of the structure variance may in some embodiments to tied to (e.g., forced to be the same as) the value of the distance variance parameter. In other embodiments, the value of this parameter may be independently specified. The value of the third parameter, intensity (or color) variance, may represent the degree of similarity of color to be considered by the filter (e.g., in the weighting described above). In some embodiments, these and/or other filter parameters may be set to default values, which then may be changed by the user. For example, in one embodiment, the default value of the distance variance parameter may be 5 and the default value of the intensity variance parameter may be 10. In some cases, it may be useful for the user to be able to control these parameters, e.g., if a structure element in a noise image is too fat or too thin for the default value of the distance variance to be effective, or if noise is too high for the default value of the intensity variance to be effective. In some embodiments, a higher or lower value of one or both of these parameters may be more effective when applying the filter to a given image.

In the example illustrated in FIG. 5, another parameter represents the brush strength. Brush strength is represented in equation 13 by $\alpha$. This parameter may be used to control the weight by which the output of structure extraction operation affects the final output image. As shown in equation 13, the final output image following a denoising operation that includes the refinement steps described herein may be generated using a weighted average of the initial denoised image output and the output from the structure extraction operation, weighted by $\alpha$. For example, if this parameter is set to 0, the filter will have no effect on the final image. If this parameter is set to 100%, the output image will reflect only the result of the structure extraction operation (e.g., 240 of FIG. 2). In some embodiments, the user may specify a fairly small value for this parameter (e.g., 30%), and may repeatedly apply the filter (e.g., using the brush interface) to a region of an image (e.g., a structural element that was removed to a noise image) until the structural element becomes as sharp as the user wants. In other words, the user may repeatedly drag the brush tool across a portion of the noise image to remove the structural element from the noise image so that it will be added back into the final output image.

Besides extracting and refining image structures from the noise image, the system described herein may also provide functionality for the user to further remove noise from the denoised image, as in 245 of FIG. 2. This operation may in some embodiments be based on a filter similar to the currently available denoising filters described above, but the filter may operate on the initial denoised image $I_l$ and may output a smoother image $I_l'$ that includes less noise. In various embodiments, using the structure aware filter, image structures may be preserved, while the user may also be able to control the region to which additional filtering is applied (e.g., using a brush tool) and/or the strength of the filtering (e.g., by specifying one or more parameters of the filtering operation through the GUI).

A comprehensive quantitative evaluation has been conducted, which demonstrated that the system and methods described herein may significantly improve the performance of existing image denoising approaches. In other words, higher quality image denoising results may be obtained using this interactive approach than may be possible using an existing automated approach. This evaluation further demonstrated that, for cases where image noise is a desired feature, this system may be used for achieving noise-consistent editing effects in a variety of applications such as image sharpening, blurring, colorization, and retargeting.

Figure 6A:
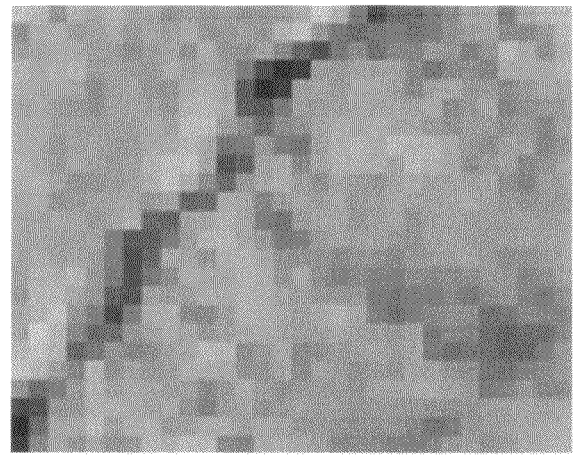
FIGS. 6A-6C illustrate extraction of structure residual from a noise image, according to one embodiment.
Figure 6B:
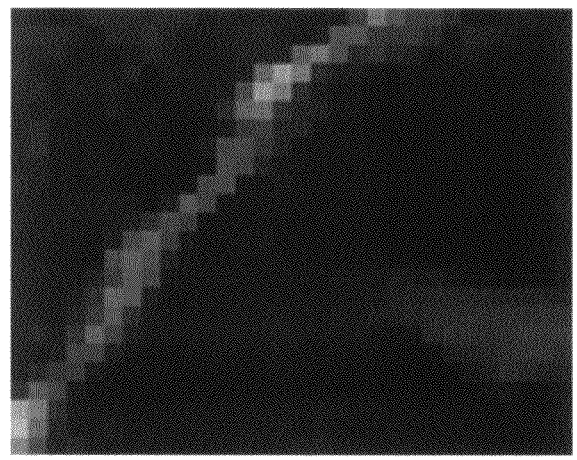
Figure 6C:
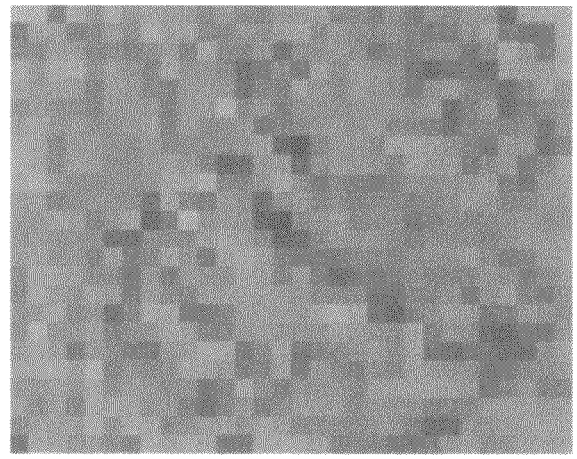

FIGS. 6A-6C illustrate an example of extracting structure residual from the noise image, according to some embodiments. FIG. 6A illustrates a portion of a noise image that contains a structural element (an edge). Applying the structure-preserving filter on the edge using the brush tool extracts the edge from the noise image, as in FIG. 6B. The resulting noise image (with the edge removed) is shown in FIG. 6C. In this example, it can be seen that the structure residual is successfully extracted, and the remaining noise residual is spatially random, as was desired.

Figure 7A:
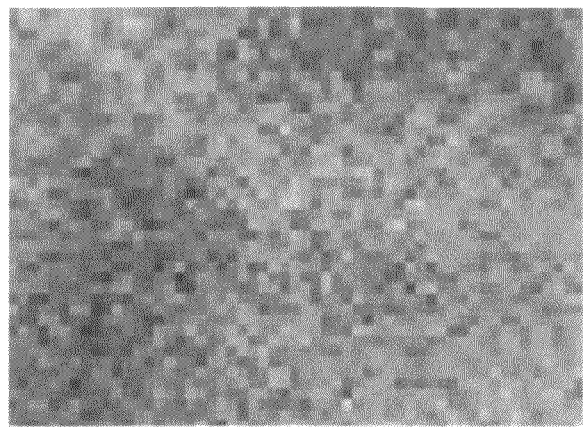
FIGS. 7A-7C illustrate user controlled noise removal from an image region, according to one embodiment.
Figure 7B:
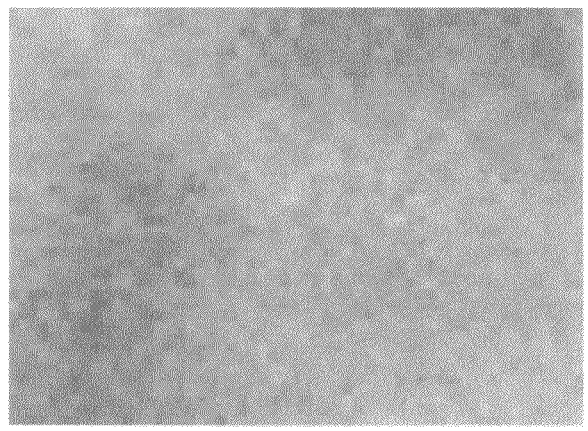
Figure 7C:

FIGS. 7A-7C illustrate the effectiveness of user controlled noise removal for regions where noise is not completely suppressed, according to one embodiment. In this example, the user selected a smooth region in the initially denoised image on which to apply the techniques described herein (shown in FIG. 7A). The methods were applied to this portion of the image to remove additional noise (shown in FIG. 7B), resulting in a better smooth region (shown in FIG. 7C).

Figure 8:
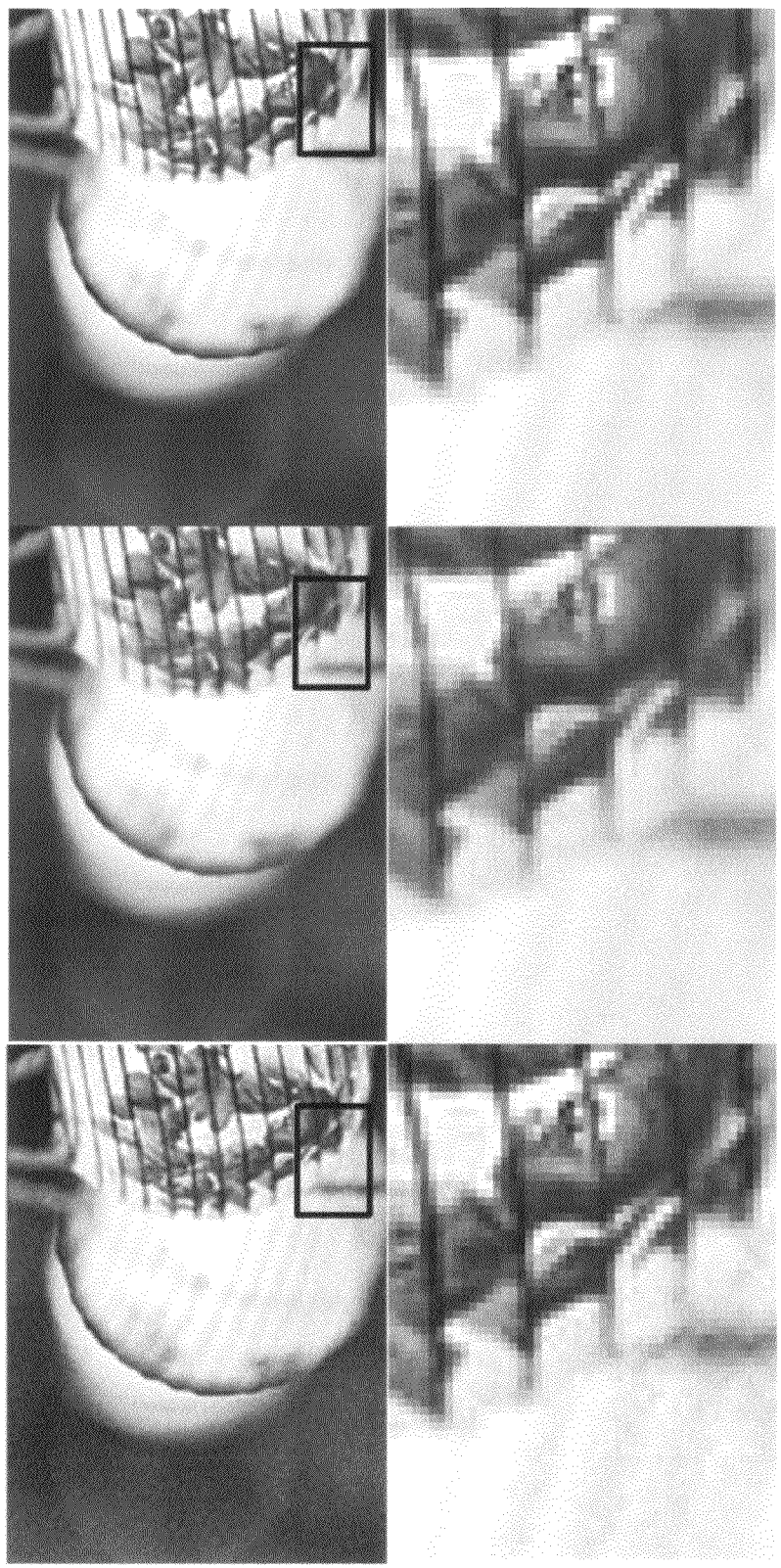
FIG. 8 illustrates results of the application of structure-preserving image-noise separation in a final image, according to one embodiment.

FIG. 8 illustrates a final processed result after several iterations of user interaction to apply the techniques described herein to the input image of FIG. 1A. In this example, the far left images on the two rows illustrate the noisy input image and a portion thereof, respectfully. The middle images on each row illustrate the initially denoised image (and the same portion thereof), and the far right images on each row illustrate the final results for the desired image (and the same portion thereof). As illustrated in FIG. 8, the methods described herein may be used to identify image structures (edges) that were mistakenly identified as noise using an existing denoising technique, to separate them from the noise image, and to add them back into the output image for a higher quality denoising result.

Figure 9:
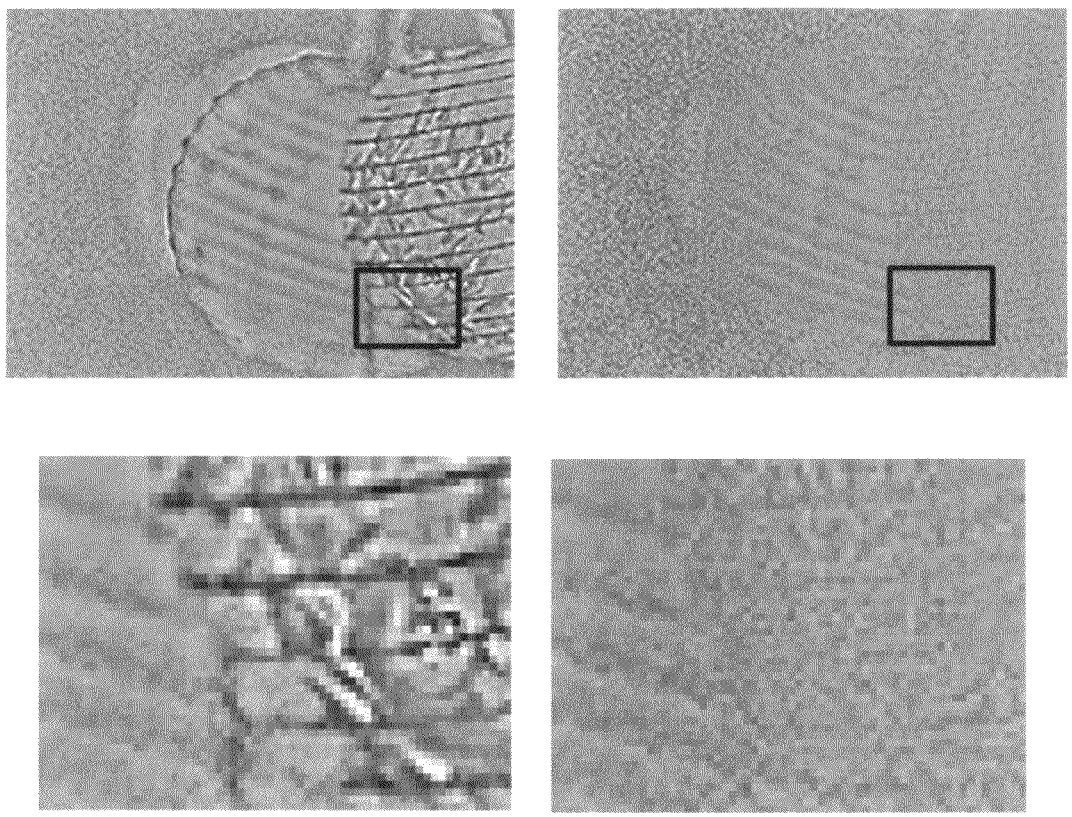
FIG. 9 illustrates results of the application of structure-preserving image-noise separation in a final noise image, according to one embodiment.

FIG. 9 illustrates the results of the techniques described herein on the noise image. In this example, the image on the top left is the initially denoised image, which includes image structures (edges). A portion of the initial noise image is shown on the bottom left. The top right image illustrates the final noise image after the structures have been identified and removed using the techniques described herein. The bottom right image illustrates a portion of the final noise image.

Figure 10:
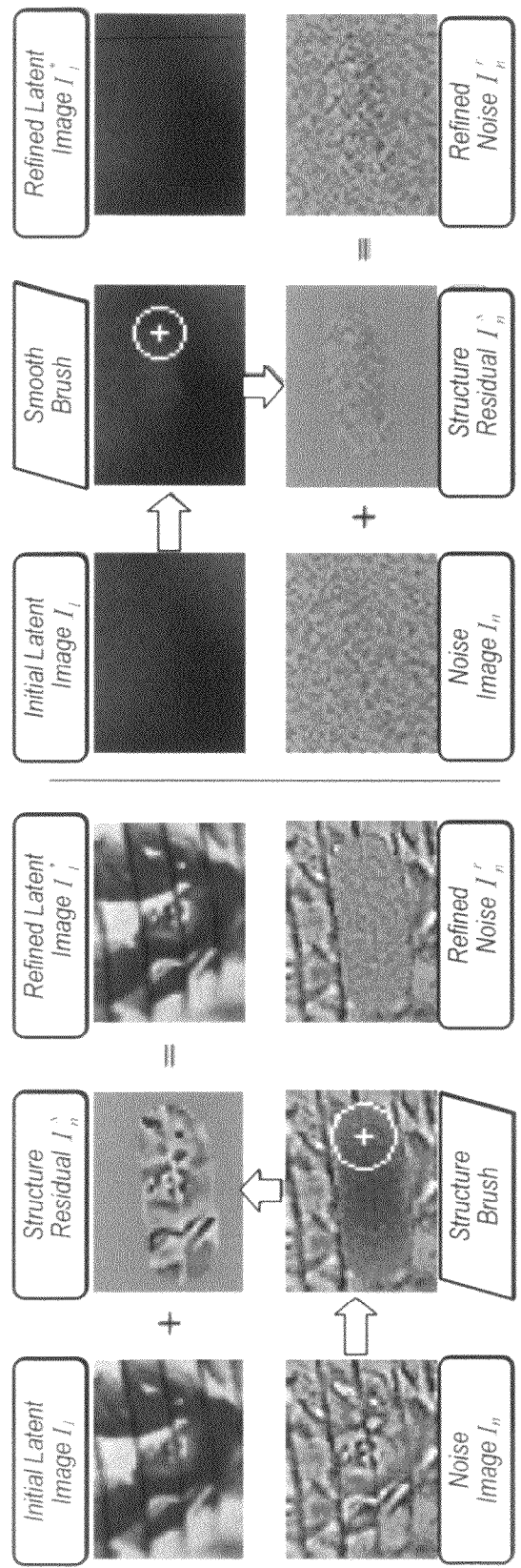
FIG. 10 illustrates the application of a structure brush and a smooth brush to an image, according to one embodiment.

FIG. 10 illustrates the application of the filter to a portion of an image and a portion of a noise image using a brush tool, as described herein. In this example, two different brushes (i.e., a "structure brush" for performing the operations illustrated as 225 of FIG. 2 and a "smooth brush" for performing the operations illustrated as 245 of FIG. 2) are applied to achieve the desired results.

Traditional edge preserving filters such as bilateral filter (BLF), joint bilateral filter and weighted least square filter (WLS) are widely used for edge aware image editing tasks. The goal of these filters is to preserve image discontinuities. Although the structure-preserving filter (SPF) described herein (e.g., in equation 12) may have a form similar to that of BLF and joint BLF, it may behave quite differently due to the added structure term (equation 9).

Figure 11:
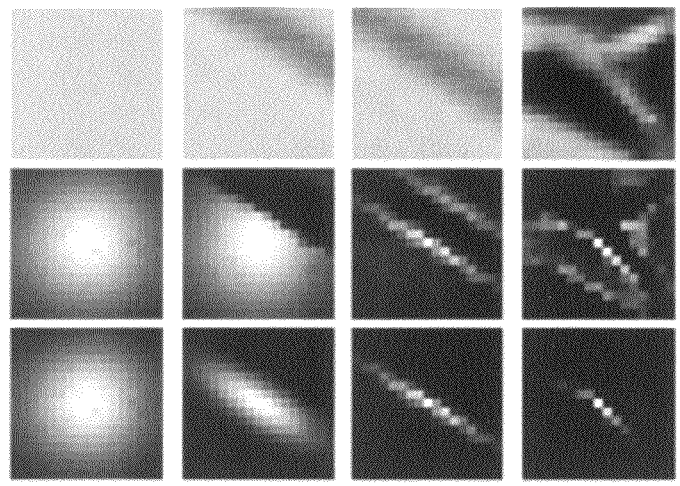
FIG. 11 illustrates a comparison between BLF and SPF in reacting to image edges and structures, according to various embodiments.

FIG. 11 illustrates a comparison between BLF and the SPF described herein in their respective responses to image edges and structures in various situations. In this example, the first row of FIG. 11 includes several image regions that have different local structures, where local weight maps are computed at the center pixel. Images in the second row are the local weight maps computed from BLF. This example illustrates that BLF is edge-aware but not structure-aware. In other words, BLF is not able to distinguish whether neighboring pixels are lying on the same image structure (see, e.g., column 3 and 4). Thus, BLF will average together samples on different structures. Although this can be partially avoided by using a smaller spatial kernel, this will result in an increase in the estimation bias. By contrast, the local weight maps generated using the structure-preserving filter described herein (as illustrated on the third row) are structure-aware. Thus, only pixels lying on the same structures are given higher weights for computing the structure residuals.

Figure 12:
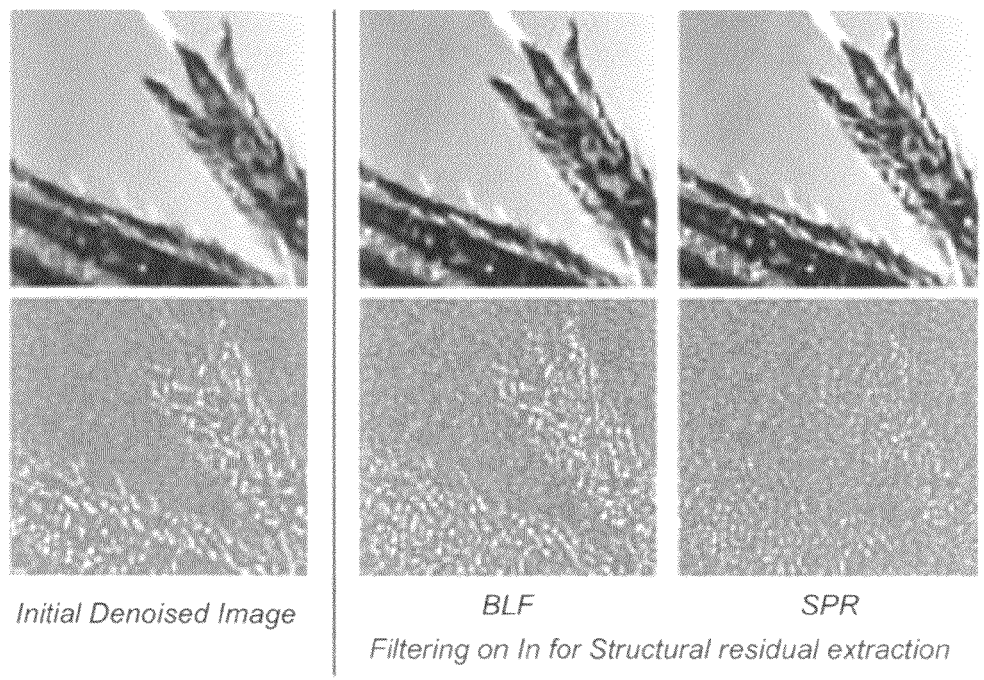
FIG. 12 illustrates a comparison between the effectiveness of BLF and SPF for structure-noise decomposition, according to various embodiments.

FIG. 12 illustrates a comparison between the effectiveness of BLF and SPF for structure-noise decomposition. In this synthetic example, Gaussian noise is added to the luminance channel of the input image. Traditional noise removal algorithms smooth out fine structure details and the structural residuals can be easily seen in the noise image $I_n$. In this example, BLF and SPF are applied to $I_n$ to extract a structural residual $I_n^s$, and are used to refine the latent image $I_l$, as shown in the second and third columns, respectively. As shown in this example, a system employing the structure-preserving filter described herein may in some embodiments generate a much better image-noise separation result based on the initial input than traditional methods.

The structure-preserving filter described herein may be significantly affected by the values of parameters $\sigma_c$, $\sigma_d$ and $\sigma_s$ (as used in equations 7-9). Generally speaking, for good results, $\sigma_c$ may be correlated to the noise level present in the input image, and $\sigma_d$ and $\sigma_s$ may be proportional to the local structure size and curvature. Although they may in some embodiments be tweaked independently, in practice these parameters may be jointly increased or decreased to reflect the overall sensitivity of the filter. In fact, in some embodiments, the value of $\sigma_s$ may be constrained to be equal to that of $\sigma_d$, as they both control the spatial sensitivity of the filter.

Intuitively, these parameters may be used to control the "minimal scale" of the structures that can be separated from noise by applying the filter. To demonstrate this, in one experiment, SPF was applied with three different sets of parameters on a noise map. In this experiment, when the parameters were set to be too small, the filter tended to extract image structures at all scales from the noise map, thus noise signal was also mistakenly extracted as structure. On the other hand, when the parameters were set to be too large, then only large-scale structures were extracted and smaller structures were left as noise. In various embodiments, setting these filter parameters properly may generate results in which image structures are completely removed while the noise signal remains intact.

Although the structure-preserving filter described herein may in some embodiments be applied automatically using fixed parameters, it may perform significantly better using locally adaptive parameters that are actively controlled by the user. Thus, applying the filter in an interactive fashion may achieve higher quality results.

As described above, in some embodiments, a structure brush may be provided to the user to facilitate the recovery of high-frequency image structures that have been smoothed out as noise in the input. As shown in FIG. 10 (left half), this brush may be directly applied to the noise layer $I_n$. Although it may be hard to notice the removed high-frequency structures on the latent image $I_l$, it may be easy for the user to see these errors on $I_n$. Thus, this interactive approach may allow the user to edit the noise layer in order to remove denoising artifacts in the output latent image.

In the following description, I is used to denote various regions in which the user brush has been applied. As described herein, if the region selected by the user using the structure brush is $I_n$, the structure-preserving filter may be applied on $I_n$ (with the help of $I_l$) to decompose it into a structural residual $I_n^s$ and a noise signal $I_n^r$. The image-noise separation result may then be updated as:

$$I_l^* = I_l + I_n^s; \; I_n^* = I_n^r \tag{14}$$

The values of the three parameters $\sigma_c$, $\sigma_d$ and $\sigma_s$ of the structure-preserving filter may in some embodiments be manually modified by the user for each brush, or may the system may be configured to automatically evolve the values of these parameters based on a gesture control mechanism. The default values of the three parameters may be set conservatively (e.g., $\sigma_c=25$, $\sigma_d=\sigma_s=7$), thus strong structure signal in $I_n$ may be filtered out using only one brush stroke. For a weaker structure signal, all three parameters may need to be decreased accordingly. In some embodiments, this may be achieved by having the user brush over the same region multiple times, as if applying a real rubber eraser. The system may then automatically and gradually decrease the values of the parameters linearly, based on how many times the user has brushed over the same region. As a result, the structure residual in $I_n$ may be gradually reduced until a completely random noise region $I_n^r$ is present. In the case that $I_n$ is over-smoothed, the user may use an undo operation to backtrack to a previous result, in some embodiments.

In some embodiments, a smooth-region brush may be used to remove visible noise residual $I_l^n$ from the smooth regions of the latent image $I_l$. In principle, the operation of a smooth-region brush may be similar to that of the structural brush, except that it may be applied on the latent image $I_l$ rather than on the noise image $I_n$. The application of a smooth-region brush in shown in FIG. 10 (right half). In this example, the user selected a region $I_l$ in which noise residual is present, and the structure-preserving filter may was applied on $I_l$ to compute the noise residual $I_l^n$. The final image-noise separation result may then be updated as:

$$I_l^* = I_l - I_l^n; \; I_n^* = I_n + I_l^n \tag{15}$$

As with the structure brush, various parameters of the structure-preserving filter in the smooth region brush may be tweaked using a similar gesture control mechanism, in some embodiments.

In various embodiments, the structure brush and/or the smooth region brush may run in a quick selection mode, in which the user only needs to provide a coarse selection and the system is configured to automatically identify the exact region of interest based on the brush strokes. In such embodiments, when using a structure brush, pixels with strong structures under the brush region may be selected. When using a smooth region brush, pixels with small spatial-color distance with respect to those under the brush may be chosen. A quick selection mode may provide a faster way for a user to select regions of interest, while the original mode may still be used for local fine-tuning of the results.

A quantitative evaluation of the methods described herein has been performed using a dataset containing 17 images chosen from the Berkeley segmentation dataset. For each test image, additive white Gaussian noise (AWGN) with 5% noise level was added. In this evaluation, six widely used denoising packages were applied to generate the initial image-noise separation results. Then the interactive methods described herein were applied to each of the initial results, and the amount of improvement was noted. In this evaluation, the user time for each example was limited to 3 minutes.

In this evaluation, the average peak signal-to-noise ratio (PSNR) gain over the entire dataset was 2.61 dB. This suggests that the methods described herein may consistently and significantly improve the image-noise separation results produced by various existing methods. In this evaluation, the results were also compared with those reported in a recently-proposed region-based approach (which reported an average PSNR difference of 1.42 dB). This suggests that methods described herein may be used to generate results of much higher quality than the state-of-the-art automatic approaches can achieve.

To demonstrate the proposed structure-preserving filter is efficient for both flat image regions as well as image structures and textures, all pixels in the 17 test images were divided into 10 groups based on their gradient magnitudes, and the average PSNR gain was computed for each group. The results suggest that the methods described herein may achieve consistent improvements across the entire frequency spectrum. In many cases larger gains were achieved in high gradient levels, indicating that previous denoising algorithms tend to destroy high frequency contents in order to generate a clean image, and that the methods described herein may be used to effectively restore them.

It is worth mentioning that each denoising package used in the evaluation provided a set of free parameters for the user to adjust, which may have affected the reported PSNR values. In these experiments, different parameter settings were tried for each algorithm on each test image, and the best setting was chosen for evaluation. Furthermore, although for the sake of consistency the same type of noise was applied to all test images in this evaluation, it was discovered that the SPF system was similarly efficient in practice against other types of noises, such as impulse noise, salt-and-pepper noise, camera lens dust, etc. To demonstrate the effectiveness of the SPF system on real noise, the methods described herein were applied to a non-flash noisy image, where a flash and non-flash image pair was used to generate a denoising result. However, this result still contained strong noticeable noise. In this experiment, a commercial denoising package was applied to generate an initial denoising result, and then the structure-preserving filtering techniques described herein were applied to generate a clean image. Note that using a single noisy image as input, the structure-preserving filter approach generated a denoising result of higher quality than the one generated by the image pair approach.

In various embodiments, the SPF approach described herein may be applied to a variety of image editing tasks. This is because, for a noisy input image, these tasks may also benefit from a high quality image-noise separation result. By additionally providing noise synthesis capabilities, the SPF-based system described herein may achieve noise-consistent image editing, where the noise characteristics of the image can be preserved after various editing operations.

One image editing task to which the SPF approach may be applied is noise synthesis. Real noise characteristics are signal-dependent and correlated with the underlying image statistics. For instance, the noise level is usually lower at pixel locations with high intensity. After applying image editing tasks, the local statistics between the edited image $I_l'$ and the original latent image $I_l$ may be different. Thus, it is inadvisable to directly copy the noise layer $I_N$ to the output image. In an SPF-based system, a patch-based noise synthesis approach may be adopted to generate a new and realistic noise layer that possesses the same characteristics as the original one.

Given the original noise layer $I_n$, a large number of noise patches $\wp_n$ may be generated by randomly choosing center points. The size of the noise patch may typically be on the order of 5×5 pixels, as the real noise signals in a small neighborhood may be expected to have spatial correlations due to CCD color filter pattern sensing and demosaicing in the imaging process of CCD cameras. These patches may then be shuffled and re-stitched together in a non-overlapping fashion before applying them to the modified image $I_l'$.

For example, suppose $I_l'(\wp)$ is a patch on image $I_l'$. To select a proper noise patch to be applied to $I_l'(\wp)$, the following data measure may be computed between $I_l'(\wp)$ and each noise patch $\wp_n$ as $$m_c = \frac{1}{|\wp|} \sum_{p \in \wp} \left\| I_l'(\wp)_p - I_l(\wp)_p \right\|^2 \qquad (16)$$

In this example, $I_l(\wp)$ represents the corresponding image patch of $\wp_n$ on the original image $I_l$, and the summation is over all pixels p in the patch. A smaller data measure may indicate a similar difference in appearance between $I_l(\wp)$ and $I_l'(\wp)$, thus the noise patch is a good fit for $I_l'(\wp)$.

In most work in patch-based texture or image synthesis, a comparability measure may be defined to measure how naturally two patches can be stitched together without introducing a seam between them. In an SPF-based system, such a measure may not be necessary, since the noise map $I_n$ generated by the system may typically be of high quality and may contain very little large-scale structural signal. Thus, stitching two noise patches together usually generates a larger random noise patch without any visually noticeable artifacts. By only employing the data measure defined above, the noise synthesis may be simple and fast, and may generate visually appealing results.

Figure 13A:
FIGS. 13A-13D illustrate examples of noise consistent image editing operations, according to various embodiments.
Figure 13B:
Figure 13C:
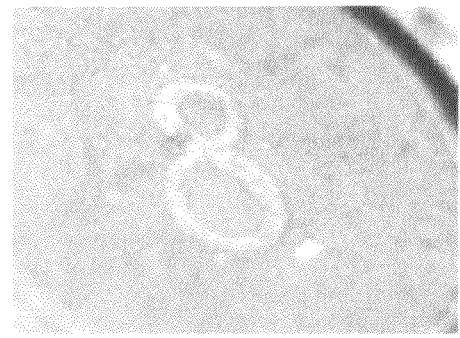
Figure 13D:

The SPF-based methods described herein may in some embodiments be applied to sharpening and/or blurring operations. Direct application of sharpening or blurring on a noisy image may boost or reduce the noise level and lead to undesirable results. This problem can be alleviated by first performing image-noise separation, and then applying the sharpening or blurring operation on the latent image only. However, artifacts may still be present in the resulting image if the image-noise separation is not sufficiently good. As shown in FIGS. 13A-13D, using an SPF-based system, as described herein, a high quality image-noise separation may be achieved. In this example, FIG. 13A illustrates a noisy input image and FIG. 13B illustrates the same image after a noise layer has been generated to blur the image, using the SPF-based methods described herein. FIG. 13C illustrates another noisy input image, and FIG. 13D illustrates the same image following a sharpening operation using the SPF-based methods described herein. These examples illustrate that, using the SPF-based system and methods described herein, a noisy image may be sharpened or blurred while preserving the overall noise level.

Another image editing task to which the SPF approach may be applied is image retargeting. Noise characteristics can be easily affected by resizing the input image, such as when creating a thumbnail image. However, in many applications, preserving the noise characteristics in the thumbnail may be desirable, since the user can quickly preview the noise without zooming into the original version. In some embodiments, an SPF-based system may be used to achieve this goal. First, a high quality image-noise separation may be obtained, as described herein. Then, SPF-based noise synthesis may be applied to re-generate a noise layer for the thumbnail image.

Another image editing task to which the SPF approach may be applied is noise transfer. Transferring noise from one image to another requires accurate image-noise separation on the source image, and thus may benefit from using an SPF-based approach. For example, although the grain matching command in After Effects® from Adobe Systems Incorporated may be employed for this purpose, the parametric grain model cannot really capture the characteristics of the unique noise presented in the source image. In contrast, by applying high quality image-noise separation followed by nonparametric noise synthesis, an SPF-based system may achieve consistent noise transfer.

Figure 14:
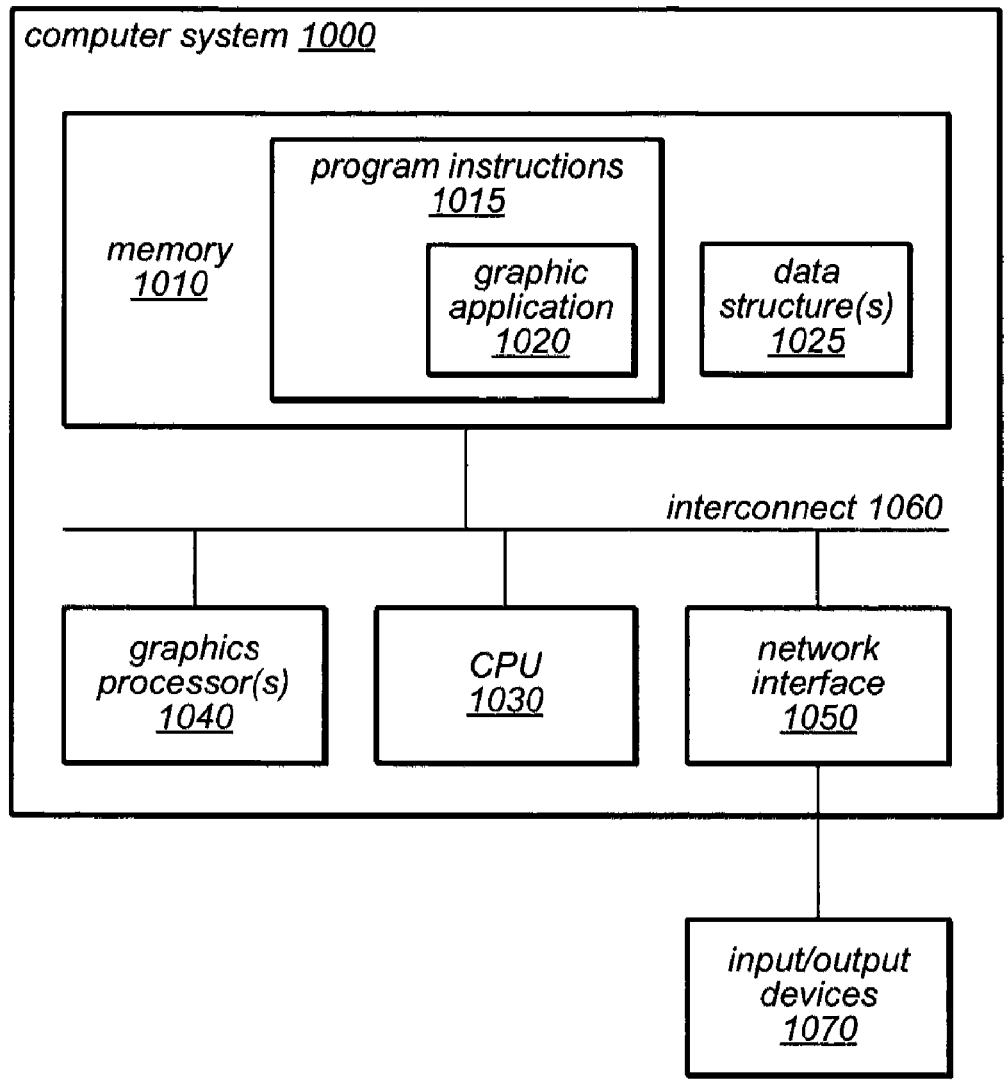
FIG. 14 illustrates a computer system configured for implementing editing of input images using patch transforms and/or refining output images using patch jittering, according to one embodiment.

The methods described herein for performing image-noise separation (e.g., within a graphics application) may be implemented by a computer system configured to provide the functionality described. FIG. 14 is a block diagram illustrating one embodiment of a computer system 1000 configured to implement such image editing operations. A graphics application such as graphics application 1020 may be configured to perform various image editing functions and to render new images accordingly. In some embodiments, a user may invoke operations to add, move or remove objects, resize objects or entire images, add, remove, or modify textures of objects in an image, apply various filters to an image, or otherwise alter an input image through a user interface of graphics application 1020. Graphics application 1020 may be configured to perform these operations and/or may employ the methods described herein for performing image-noise separation. Graphics application 1020 may be configured to render the output image to a separate window, or directly into the same frame buffer containing the input image, in different embodiments.

Graphics application 1020 may represent various types of graphics applications, such as painting, publishing, photography, games, animation, and other applications. Additionally, graphics application 1020 may utilize a graphics processor 1040 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1040 may implement a number of graphics primitive operations in a way that makes executing them much faster than drawing directly to the screen with a host central processing unit (CPU), such as CPU 1030. In various embodiments, the methods disclosed herein for may be implemented by program instructions configured for parallel execution on two or more such GPUs. The GPU 1000 may implement one or more application programmer interfaces (APIs) that permit programmers to invoke the functionality of the GPU. Suitable GPUs may be commercially available from vendors such as NVIDIA Corporation, ATI Technologies, and others.

Note that functionality and/or features described herein as being part of, or performed by, graphics application 1020 may, in some embodiments, be part of, or performed by, one or more graphics processors, such as graphics processor 1040. As described above, in some embodiments graphics application 1020 may be configured to render modified images into a different window than input images.

An image editing application that implements the methods described herein for performing image-noise separation may be implemented on various types of computer systems. Referring again to FIG. 14, computer system 1000 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1020, which may be configured to performing image-noise separation, as described herein, may be provided as a computer program product, or software, that may include a computer-readable storage medium having stored thereon instructions, which may be used to program a computer system (or other electronic devices) to implement image editing using the techniques described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 14, computer system 1000 may include one or more processor units (CPUs) 1030. Processors 1030 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 1000, such as various versions of Unix, Linux, Windows™ from Microsoft Corporation, MacOS™ from Apple Corporation, or any other operating system that enables the operation of software on a hardware platform.

The computer system 1000 may also include one or more system memories 1010 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 1000 via interconnect 1060. Memory 1010 may include other types of memory as well, or combinations thereof. One or more of memories 1010 may include program instructions 1015 executable by one or more of processors 1030 to implement aspects of the image-noise separation techniques described herein. Program instructions 1015, which may include program instructions configured to implement graphics application 1020, may be partly or fully resident within the memory 1010 of computer system 1000 at any point in time. Alternatively, program instructions 1015 may be provided to GPU 1040 for performing image editing operations (or portions thereof) on GPU 1040 using one or more of the techniques described herein. In some embodiments, the techniques described herein may be implemented by a combination of program instructions 1015 executed on one or more processors 1030 and one or more GPUs 1040, respectively. Program instructions 1015 may also be stored on an external storage device (not shown) accessible by the processor(s) 1030 and/or GPU 1040, in some embodiments. Any of a variety of such storage devices may be used to store the program instructions 1015 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 1030 and/or GPU 1040 through one or more storage or I/O interfaces including, but not limited to, interconnect 1060 or network interface 1050, as described herein. In some embodiments, the program instructions 1015 may be provided to the computer system 1000 via any suitable computer-readable storage medium including memory 1010 and/or external storage devices described above. Memory 1010 may also be configured to implement one or more data structures 1025, such as one or more data structures configured to store data representing one or more input images, output images, or intermediate images (e.g., noise layers, denoised latent images, residual images, etc.). Data structures 1025 may be accessible by processor(s) 1030 and/or GPU 1040 when executing graphics application 1020 or other program instructions 1015.

As shown in FIG. 14, processor(s) 1030 may be coupled to one or more of the other illustrated components by at least one communications bus, such as interconnect 1060 (e.g., a system bus, LDT, PCI, ISA, or other communication bus type), and a network interface 1050 (e.g., an ATM interface, an Ethernet interface, a Frame Relay interface, or other interface). The CPU 1030, the network interface 1050, and the memory 1010 may be coupled to the interconnect 1060. It should also be noted that one or more components of system 1000 might be located remotely and accessed via a network.

As noted above, in some embodiments, memory 1010 may include program instructions 1015, comprising program instructions configured to implement graphics application 1020, as described herein. Graphics application 1020 may be implemented in various embodiments using any desired programming language, scripting language, or combination of programming languages and/or scripting languages, e.g., C, C++, C#, Java™, Perl, etc. For example, in one embodiment, graphics application 1020 may be JAVA based, while in another embodiments, it may be implemented using the C or C++ programming languages. In other embodiments, graphics application 1020 may be implemented using specific graphic languages specifically for developing programs executed by specialize graphics hardware, such as GPU 1040. In addition, graphics application 1020 may be embodied on memory specifically allocated for use by graphics processor(s) 1040, such as memory on a graphics board including graphics processor(s) 1040. Thus, memory 1010 may represent dedicated graphics memory as well as general-purpose system RAM, in various embodiments. Memory 1010 may in some embodiments also include a data store configured to store image data for one or more input images and/or output images, in various embodiments. Other information not described herein may be included in memory 1010 and may be used to implement the methods described herein and/or other functionality of computer system 1000.

Network interface 1050 may be configured to enable computer system 1000 to communicate with other computers, systems or machines, such as across a network. Network interface 1050 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1000 is interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 1050 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 14, memory 1010 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 1040 and the rest of the computer system 1000 may travel through a graphics card slot or other interface, such as interconnect 1060 of FIG. 14.

Computer system 1000 may also include one or more additional I/O interfaces, such as interfaces for one or more user input devices 1070, or such devices may be coupled to computer system 1000 via network interface 1050. For example, computer system 1000 may include interfaces to a keyboard, a mouse or other cursor control device, a joystick, or other user input devices 1070, in various embodiments. Additionally, the computer system 1000 may include one or more displays (not shown), coupled to processors 1030 and/or other components via interconnect 1060 or network interface 1050. Such input/output devices may be configured to allow a user to interact with graphics application 1020 to request or invoke various image editing operations and/or to specify various parameters, thresholds, and/or other configurable options available to the user when editing images while executing graphic application 1020. It will be apparent to those having ordinary skill in the art that computer system 1000 may also include numerous other elements not shown in FIG. 14.

Note that program instructions 1015 may be configured to implement a graphic application 1020 as a stand-alone application, or as a module of another graphics application or graphics library, in various embodiments. For example, in one embodiment program instructions 1015 may be configured to implement graphics applications such as painting, publishing, photography, games, animation, and/or other applications, and may be configured to edit images as part of one or more of these graphics applications. In another embodiment, program instructions 1015 may be configured to implement the image editing techniques described herein in one or more functions called by another graphics application executed on GPU 1040 and/or processor(s) 1030. Program instructions 1015 may also be configured to render images and present them on one or more displays as the output of an image editing operation and/or to store image data for modified and/or reconstructed images in memory 1010 and/or an external storage device(s), in various embodiments. For example, a graphics application 1020 included in program instructions 1015 may utilize GPU 1040 when modifying, rendering, or displaying images in some embodiments.

While various image editing techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system, comprising:
one or more processors; and
a memory coupled to the one or more processors and storing program instructions executable by the one or more processors to implement:
accessing data representing an initially denoised image and data representing a corresponding initial noise layer, wherein the initially denoised image is an output of an initial denoising operation performed on a noisy input image, wherein the corresponding initial noise layer is also obtained from the noisy input image, and wherein the initial noise layer represents a difference between the noisy input image and the initially denoised image;
applying a structure-preserving filter to the data representing the initial noise layer to extract image structure from the initial noise layer;
combining data representing the extracted image structure with the data representing the initially denoised image to produce data representing a refined image; and
displaying the refined image.

2. The system of claim 1, wherein the program instructions are further executable by the one or more processors to implement:
performing the initial denoising operation on the noisy input image; and subtracting the data representing the initially denoised image from the data representing the noisy input image to obtain the data representing the initial noise layer.

3. The system of claim 1, wherein the program instructions are further executable by the one or more processors to implement:
subtracting the data representing the extracted image structure from the data representing the initial noise layer to produce data representing a refined noise layer; and
displaying the refined noise layer.

4. The system of claim 3, wherein the program instructions are further executable by the one or more processors to implement:
applying the structure-preserving filter to the data representing the refined noise layer to extract additional image structure from the refined noise layer;
combining data representing the additional extracted image structure with the data representing the refined image to produce data representing a further refined image;
displaying the further refined image.

5. The system of claim 1, wherein said applying a structure-preserving filter comprises:
displaying the data representing the initial noise layer;
receiving input identifying a region of the initial noise layer to which the structure-preserving filter should be applied; and
applying the structure-preserving filter to the identified region of the initial noise layer.

6. The system of claim 5, wherein the program instructions are further executable by the one or more processors to implement a user interface, and wherein the input is received through the user interface.

7. The system of claim 6, wherein the user interface comprises a structure brush tool usable to identify the region of the initial noise layer on which to apply the structure-preserving filter.

8. The system of claim 1, wherein said applying a structure-preserving filter comprises applying the structure-preserving filter in accordance with one or more configurable filter parameters.

9. The system of claim 8, wherein a value of at least one of the one or more configurable filter parameters is a default value.

10. The system of claim 8, wherein the program instructions are further executable by the one or more processors to implement a user interface, and wherein a value of at least one of the one or more configurable filter parameters is received through the user interface.

11. The system of claim 10, wherein the user interface comprises one or more of: a radio button, a slider bar, an alphanumeric text entry box, a pop-up menu, a pull-down menu, or a dial.

12. The system of claim 8, wherein the one or more configurable parameters comprise a distance variance parameter.

13. The system of claim 8, wherein the one or more configurable parameters comprise a color variance parameter.

14. The system of claim 8, wherein the one or more configurable parameters comprise a structural variance parameter.

15. The system of claim 8, wherein the one or more configurable parameters comprise a brush strength parameter.

16. The system of claim 1, wherein the program instructions are further executable by the one or more processors to implement:
receiving input identifying a region of the initially denoised image;
applying a denoising technique to the identified region of the initially denoised image to produce a smoother denoised image;
combining data representing the smoother denoised image with data representing the refined image to produce data representing an output image; and
displaying the output image.

17. The system of claim 16, wherein the program instructions are further executable by the one or more processors to implement a user interface, and wherein the input is received through the user interface.

18. The system of claim 17, wherein the user interface comprises a smooth brush tool usable to identify the region of the initially denoised image on which to apply the denoising technique.

19. The system of claim 16, wherein said applying a denoising technique to the identified region of the initially denoised image comprises applying the denoising technique to the identified region two or more times to produce the smoother output image.

20. The system of claim 1, wherein the one or more processors comprise at least one of a general-purpose central processing unit (CPU) or a graphics processing unit (GPU).

21. A method, comprising using a computer to implement:
accessing data representing an initially denoised image and data representing a corresponding initial noise layer, wherein the initially denoised image is an output of an initial denoising operation performed on a noisy input image, wherein the corresponding initial noise layer is also obtained from the noisy input image, and wherein the initial noise layer represents a difference between the noisy input image and the initially denoised image;
applying a structure-preserving filter to the data representing the initial noise layer to extract image structure from the initial noise layer;
combining data representing the extracted image structure with the data representing the initially denoised image to produce data representing a refined image; and
displaying the refined image.

22. The method of claim 21, further comprising:
performing the initial denoising operation on the noisy input image; and
subtracting the data representing the initially denoised image from the data representing the noisy input image to obtain the data representing the initial noise layer.

23. The method of claim 21, further comprising:
subtracting the data representing the extracted image structure from the data representing the initial noise layer to produce data representing a refined noise layer; and
displaying the refined noise layer.

24. The method of claim 23, further comprising:
applying the structure-preserving filter to the data representing the refined noise layer to extract additional image structure from the refined noise layer;
combining data representing the additional extracted image structure with the data representing the refined image to produce data representing a further refined image;
displaying the further refined image.

25. The method of claim 21, wherein said applying a structure-preserving filter comprises:
displaying the data representing the initial noise layer;
receiving input identifying a region of the initial noise layer to which the structure-preserving filter should be applied; and
applying the structure-preserving filter to the identified region of the initial noise layer.

26. The method of claim 21, wherein said applying a structure-preserving filter comprises applying the structure-preserving filter in accordance with one or more configurable filter parameters.

27. The method of claim 26, wherein a value of at least one of the one or more configurable filter parameters is a default value.

28. The method of claim 26, wherein the one or more configurable parameters comprise a distance variance parameter, a color variance parameter, a structural variance parameter, or a brush strength parameter.

29. The method of claim 21, further comprising:
receiving input identifying a region of the initially denoised image;
applying a denoising technique to the identified region of the initially denoised image to produce a smoother denoised image;
combining data representing the smoother denoised image with data representing the refined image to produce data representing an output image; and
displaying the output image.

30. The method of claim 29, wherein said applying a denoising technique to the identified region of the initially denoised image comprises applying the denoising technique to the identified region two or more times to produce the smoother output image.

31. A non-transitory, computer-readable storage medium storing program instructions computer-executable to implement:
accessing data representing an initially denoised image and data representing a corresponding initial noise layer, wherein the initially denoised image is an output of an initial denoising operation performed on a noisy input image, wherein the corresponding initial noise layer is also obtained from the noisy input image, and wherein the initial noise layer represents a difference between the noisy input image and the initially denoised image;
applying a structure-preserving filter to the data representing the initial noise layer to extract image structure from the initial noise layer;
combining data representing the extracted image structure with the data representing the initially denoised image to produce data representing a refined image; and
displaying the refined image.

32. The non-transitory, computer-readable storage medium of claim 31, wherein the program instructions are further computer-executable to implement:
performing the initial denoising operation on the noisy input image; and
subtracting the data representing the initially denoised image from the data representing the noisy input image to obtain the data representing the initial noise layer.

33. The non-transitory, computer-readable storage medium of claim 31, wherein the program instructions are further computer-executable to implement:
subtracting the data representing the extracted image structure from the data representing the initial noise layer to produce data representing a refined noise layer; and
displaying the refined noise layer.

34. The non-transitory, computer-readable storage medium of claim 33, wherein the program instructions are further computer-executable to implement:
applying the structure-preserving filter to the data representing the refined noise layer to extract additional image structure from the refined noise layer;
combining data representing the additional extracted image structure with the data representing the refined image to produce data representing a further refined image;
displaying the further refined image.

35. The non-transitory, computer-readable storage medium of claim 31, wherein said applying a structure-preserving filter comprises:
displaying the data representing the initial noise layer;
receiving input identifying a region of the initial noise layer to which the structure-preserving filter should be applied; and
applying the structure-preserving filter to the identified region of the initial noise layer.

36. The non-transitory, computer-readable storage medium of claim 35,
wherein the program instructions are further computer-executable to implement a user interface;
wherein the input is received through the user interface; and
wherein the user interface comprises a structure brush tool usable to identify the region of the initial noise layer on which to apply the structure-preserving filter.

37. The non-transitory, computer-readable storage medium of claim 31, wherein said applying a structure-preserving filter comprises applying the structure-preserving filter in accordance with one or more configurable filter parameters.

38. The non-transitory, computer-readable storage medium of claim 37, wherein the one or more configurable parameters comprise a distance variance parameter, a color variance parameter, a structural variance parameter, or a brush strength parameter.

39. The non-transitory, computer-readable storage medium of claim 31, wherein the program instructions are further computer-executable to implement:
receiving input identifying a region of the initially denoised image;
applying a denoising technique to the identified region of the initially denoised image to produce a smoother denoised image;
combining data representing the smoother denoised image with data representing the refined image to produce data representing an output image; and
displaying the output image.

40. The non-transitory, computer-readable storage medium of claim 39,
wherein the program instructions are further computer-executable to implement a user interface;
wherein the input is received through the user interface; and
wherein the user interface comprises a smooth brush tool usable to identify the region of the initially denoised image on which to apply the denoising technique.

41. A computer-implemented method, comprising:
executing instructions on a specific apparatus to access binary digital electronic signals representing an initially denoised image and binary digital electronic signals representing a corresponding initial noise layer, wherein the initially denoised image is an output of an initial denoising operation performed on a noisy input image, wherein the corresponding initial noise layer is also obtained from the noisy input image, and wherein the initial noise layer represents a difference between the noisy input image and the initially denoised image;
executing instructions on said specific apparatus to apply a structure-preserving filter to the binary digital electronic signals representing the initial noise layer to extract image structure from the initial noise layer;

executing instructions on said specific apparatus to combine the binary digital electronic signals representing the extracted image structure with the binary digital signals representing the initially denoised image to produce binary digital signals representing a refined image; and storing the binary digital signals representing the refined image in a memory location of said specific apparatus for later use.

\* \* \* \* \*